United States Patent
Areno et al.

(10) Patent No.: US 9,940,483 B2
(45) Date of Patent: Apr. 10, 2018

(54) FIRMWARE SECURITY INTERFACE FOR FIELD PROGRAMMABLE GATE ARRAYS

(71) Applicant: Raytheon Company, Waltham, MA (US)

(72) Inventors: Matthew C. Areno, Round Rock, TX (US); John Hoffman, Fairview, TX (US); William T. Jennings, Plano, TX (US)

(73) Assignee: Raytheon Company, Waltham, MA (US)

(*) Notice: Subject to any disclaimer, the term of this patent is extended or adjusted under 35 U.S.C. 154(b) by 139 days.

(21) Appl. No.: 15/005,412

(22) Filed: Jan. 25, 2016

(65) Prior Publication Data

US 2017/0213053 A1 Jul. 27, 2017

(51) Int. Cl.
*G06F 21/76* (2013.01)

(52) U.S. Cl.
CPC .................... *G06F 21/76* (2013.01)

(58) Field of Classification Search
CPC ...................................................... G06F 21/76
See application file for complete search history.

(56) References Cited

U.S. PATENT DOCUMENTS

2005/0033969 A1 2/2005 Kiiveri et al.
2009/0007275 A1* 1/2009 Gehrmann ............ G06F 21/445
726/27

FOREIGN PATENT DOCUMENTS

WO WO-2017132084 A1 8/2017

OTHER PUBLICATIONS

"International Application Serial No. PCT/US2017/014513, International Search Report dated Mar. 13, 2017", 3 pgs.
"International Application Serial No. PCT/US2017/014513, Written Opinion dated Mar. 13, 2017", 6 pgs.

* cited by examiner

*Primary Examiner* — Beemnet Dada
(74) *Attorney, Agent, or Firm* — Schwegman Lundberg & Woessner, P.A.

(57) ABSTRACT

This disclosure provides for implementing a firmware security interface within a field-programmable gate array (FPGA) for communicating between secure and non-secure environments executable within the FPGA. A security monitor is implemented within the programmable logic of the FPGA as a soft core processor and the firmware security interface modifies one or more functions of the security monitor. The modifications to the security monitor include establishing a timer "heartbeat" within the FPGA to ensure that the FPGA invokes a secure environment and raising an alarm should the FPGA fail to invoke such environment.

18 Claims, 8 Drawing Sheets

FIRMWARE SECURITY INTERFACE FOR FIELD PROGRAMMABLE GATE ARRAYS

TECHNICAL FIELD

The subject matter disclosed herein generally relates to securing software and hardware elements of a field programming gate array (FPGA) and, in particular, to a security interface that facilitates the communication between a secure and non-secure environment executed within the FPGA.

BACKGROUND

An FPGA is an integrated circuit designed to be configured by a customer or a designer after manufacturing. The FPGA configuration is generally specified using a hardware description language (HDL), which is similar to the language used for an application-specific integrated circuit (ASIC). An FPGA contains an array of programmable logic blocks, and a hierarchy of reconfigurable interconnects that allow the blocks to be arranged in different configurations. The logic blocks can be configured to perform complex combinational functions or simple logic gates, like AND and XOR.

In addition to the programmable logic, an FPGA may include central processing units (CPU) to execute a variety of software stored on an external machine-readable medium. With its small size, CPUs, and programmable logic, an FPGA is an ideal device for executing tasks in an embedded environment. In some instances, the embedded environment may be used to perform tasks on sensitive data where maintaining the security of the data is a non-trivial concern. Thus, ensuring that the FPGA is operating in a secure manner is important to maintaining the security of the sensitive data.

BRIEF DESCRIPTION OF THE DRAWINGS

Some embodiments are illustrated by way of example and not limitation in the figures of the accompanying drawings.

DETAILED DESCRIPTION

Example methods and systems are directed to implementing a firmware security interface within an FPGA for communicating between a secure environment executable and a hardware security solution within the FPGA. In one embodiment, a security monitor is implemented as a soft core processor within the programmable logic of the FPGA and the firmware security interface modifies one or more functions of the security monitor. The modifications to the security monitor include establishing a timer "heartbeat" within the FPGA to ensure that the FPGA invokes a secure environment and raising an alarm should the FPGA fail to invoke such environment.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
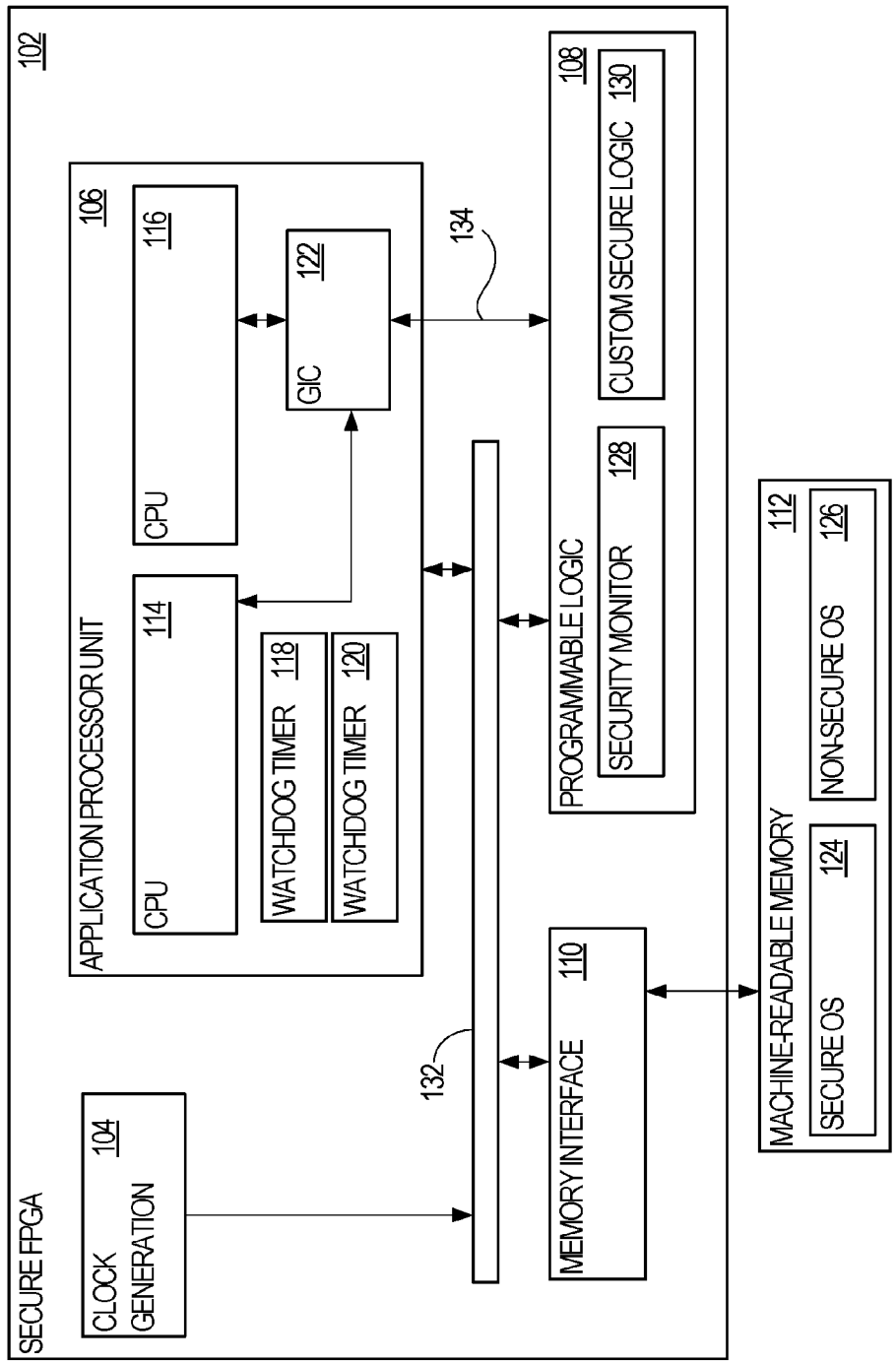
FIG. 1 is a block diagram illustrating an FPGA configured to operate in a secure and non-secure manner, according to an example embodiment.

FIG. 1 is a block diagram illustrating an FPGA 102 configured to operate in a secure and non-secure manner, according to an example embodiment. As shown in FIG. 1, the secure FPGA 102 includes a clock generation circuit 104, an application processor unit 106, a programmable logic 108, and a memory interface 110. In addition, the secure FPGA 102 is communicatively coupled to machine-readable memory 112. While FIG. 1 illustrates that the secure FPGA 102 includes components 104-112, one of ordinary skill in the art will appreciate that the secure FPGA 102 may include alternative or different components as well. One example of a secure FPGA 102 that may be modified according to the disclosure herein is the Zynq-7000 system-on-chip (SoC) family of FPGAs, which are available from Xilinx, Inc. located in San Jose, Calif.

The clock generation circuit 104 is configured to generate a clock signal for one or more timers within the secure FPGA 102. In one embodiment, the clock generation circuit 104 generates the clock signal according to a phase shift input pin coupled to the secure FPGA 102, which serves as a reference signal for other components of the secure FPGA 102. In particular, and in one embodiment, this reference clock signal is routed to different sections of the secure FPGA 102, such as a phased locked loop (PLL) module communicatively coupled to the application processor unit (APU) 106. The clock signal is then distributed to the CPUs 114, 116 of the APU 106 and referenced by the watchdog timers 118, 120. In addition, the clock signal is provided to the programmable logic 108, which is used for various timing purposes as discussed further below. FIG. 1 illustrates that the clock signal of the clock generation circuit 104 is distributed via a system bus 132, however, the clock signal may also be distributed by copper traces connecting output pins of the clock generation circuit 104 with corresponding input pins of the APU 106 and the programmable logic 108 (directly or indirectly).

The APU 106 includes a first CPU 114, a second CPU 116, a first watchdog timer 118, a second watchdog timer 120, and a general interrupt controller (GIC) 122. The APU 106 is configured to execute software and firmware accessible to the secure FPGA 102. One example of an APU 106 for the secure FPGA 102 is the dual ARM Cortex-9 APU, which is found within the Zynq-7000 family series of SoC FPGAs from Xilinx, Inc.

The secure FPGA 102 is configured with ARM TrustZone technology, which is been developed by ARM Inc., located in San Jose, Calif. As known to one of ordinary skill in the art, TrustZone is a set of hardware security extensions to ARM SoC covering the processor, memory, and peripherals.

With TrustZone, various components of the secure FPGA 102 can be partitioned into a secure environment and a non-secure (e.g., normal) environment. In addition, the components in the non-secure environment cannot directly access components in the secure environment, but rather indirectly through requests to the secure environment. As one example, machine-readable memory accessible to the secure FPGA 102 can be partitioned into secure memory and non-secure memory. As another example, and as discussed further below, the secure FPGA 102 may execute a secure operating system to handle requests for secure services or secured hardware resources and a non-secure operating system to handle non-secure tasks.

Moreover, each of the CPUs 114, 116 are configured with the ARM TrustZone extensions such that a designated CPU can be instructed to operate either in the secure environment or the normal environment (e.g., non-secure environment). The environment in which a CPU is executing is indicated by an NS bit, which is propagated through the system bus 132. When a CPU is in the secure environment, the CPU has access to the secured components and resources of the secure FPGA 102. If a process being executed by the non-secure CPU requires access to a resource in the secure environment, the non-secure CPU must make a specific call to the secure CPU to request access to the secure resource. In one embodiment, either of the CPUS 114, 116 may be instructed to transition to the secure environment. In this embodiment, the CPU 114 or the CPU 116 may be instructed to perform one or more operations in the secure environment. In an alternative embodiment, one of the CPUS 114, 116 is dedicated to transition between the secure environment and the non-secure environment.

The CPUs 114, 116 of the APU 106 may transition from the normal environment to the secure environment in one of four ways: through an external abort handler, an interrupt request (IRQ), a fast interrupt request (FIQ), or a Secure Monitor Call (SMC) instruction from the non-secure environment. Accordingly, each of the CPUs 114, 116 are communicatively coupled to the GIC 122 via an interrupt interface (not shown). The GIC 122 handles incoming IRQs and FIQs from various components and peripherals of the secure FPGA 102, such as the programmable logic 108 (discussed further below). The difference between an FIQ and IRQ is that an FIQ is typically given a higher priority than an IRQ such that the CPU services the FIQ before it services the IRQ, and in some instances, may ignore the IRQ.

In addition, each of the CPUs 114, 116 have corresponding private watchdog timers 118, 120, which can be loaded with a value that is decremented until the value reaches zero. In particular, each of the watchdog timers 118, 120 includes a load value register that loads the value into the corresponding watchdog timer. The watchdog timers 118, 120 can be configured to automatically reload the value in the load value register when the watchdog timer reaches zero or can set an event flag (e.g., a status register) indicating that the watchdog timer has reached zero. Where the watchdog timer is configured to set the event flag, the watchdog timer then sends an interrupt (e.g., an IRQ or FIQ) to the GIC 122 to indicate that it has reached zero. Accordingly, the GIC 122 then communicates the received watchdog timer interrupt to a designated CPU as indicated by the watchdog timer interrupt. As discussed below, this watchdog timer interrupt can indicate whether or not the respective watchdog timer was reset.

The programmable logic 108 is communicatively coupled to the APU 106 via the system bus 132 and a dedicated communication line 134. The system bus 132 facilitates the handling of instructions communicated from the security monitor 128 to one or more of the CPUs 114, 116. In contrast, the dedicated communication line 134 handles interrupt requests and fast interrupt requests communicated from the programmable logic 108 to the GIC 122.

In one embodiment, portions of the programmable logic 108 are configured to operate as a security monitor 128. The security monitor 128 is a "soft core" processor configured to independently operate and monitor the secure status of the secure FPGA 102. As known to one of ordinary skill in the art, a soft core processor is a microprocessor core that is implemented using logic synthesis. The soft core processor can be implemented via different semiconductor devices containing programmable logic (e.g., ASIC, FPGA, CPLD), including both high-end and commodity variations. One example of a security monitor 128 that may be implemented by the secure FPGA 102 is the Xilinx Security Monitor IP Core, which is available as a fully placed-and-routed design file.

In conventional use, the security monitor 128 monitors the software and logic elements of the secure FPGA 102, such as the operational temperature of the components of the secure FPGA 102 and the bitstream received by the secure FPGA 102. However, as provided in its default configuration, the security monitor 128 does not monitor whether the secure environment is actually executed by the secure FPGA 102. As provided in this disclosure, the custom secure logic 130 extends the functionality of the security monitor 128 to include this feature.

Accordingly, the custom secure logic 130 defines additional functions and interfaces for the security monitor 128 to appropriately monitor the execution of the secure environment by one or more of the CPUs 114, 116. In one embodiment, the interfaces defined by the custom secure logic 130 include an interrupt interface, a watchdog timer interface, a system bus interface, and a CPU interface. While this embodiment includes these four interfaces, alternative implementations of the secure FPGA 102 and/or the custom secure logic 130 may include fewer alternative interfaces. Such alternative implementations are contemplated as falling within the scope of this disclosure.

In one embodiment, the interrupt interface facilitates communications between the security monitor 128 and the general interrupt controller 122. In particular, the interrupt interface provides the parameters and function calls for the security monitor 128 to generate interrupts communicated to the GIC 122. As discussed below, the security monitor 128 communicates an interrupt to the GIC 122 that instructs the CPU 116 to transition to the secure environment. Examples of parameters that are defined by the interrupt interface include, but are not limited to, the interrupt registers of the CPU 116, an FIQ register parameter that indicates whether the GIC 122 signals a secure interrupt to the CPU 116, a targeted CPU parameter that indicates the CPU to interrupt, and other such interrupt parameters or combinations of interrupt parameters. In alternative embodiments, the interrupt interface defines fewer or alternative parameters.

In one embodiment, the watchdog timer interface facilitates communications between the security monitor 128 and one or more of the watchdog timers 118, 120. More particularly, and as discussed below with reference to FIGS. 2-4, a selected watchdog timer is manipulated to ensure that a corresponding CPU transitions between the secure and non-secure environments. Examples of parameters that are defined by the watchdog interface include, but are not limited to, a load value parameter that indicates the amount of time the watchdog timer is to count, a reload parameter that indicates whether the watchdog timer is to reload the value from the load value parameter, and an enable parameter that indicates whether the timer is enabled or disabled. In this way, and as discussed below, a watchdog timer, such as the watchdog timer 120, can be loaded with a value specified by the load value parameter which is then decremented until the watchdog timer reaches zero.

The system bus interface facilitates communications between the programmable logic 108 and system bus 132. In particular, the system bus interface provides the parameters and function calls that the security monitor 128 uses to select a bus line of the system bus 132, and then to use the selected bus line for communications. Examples of bus lines provided by the system bus 132 include an AXI 32-bit bus line, an AXI 64-bit bus line, an AHB 32-bit bus line, an APB 32-bit bus line, and other such bus lines or combination of bus lines. While FIG. 1 illustrates the system bus 132 as a linear block, one of ordinary skill in the art will understand that the system bus 132 includes many different bus lines, which, in some instances, may run in different directions to different components of the secure FPGA 102.

In one embodiment, the CPU interface facilitates communications between the security monitor 128 and a selected CPU (e.g., CPU 114 or CPU 116). In particular, the CPU interface provides the parameters and function calls that the security monitor 128 uses to communicate with the selected CPU and to transition the selected CPU from the non-secure environment to the secure environment and back again. In addition, the security monitor 128 uses the defined CPU interface to instruct a selected CPU to reset a given watchdog timer according to the value loaded into the load value register of the given watchdog timer. As discussed below, one of the features provided by the custom secure logic 130 is that the security monitor 128 is extended to instruct a selected CPU to reset a designated watchdog timer while the selected CPU is operating in the secure environment. As one example, this feature has a technical benefit of confirming or ensuring that the secure FPGA 102 transitions to the secure environment and that the secure environment is operating as expected.

Figure 2:
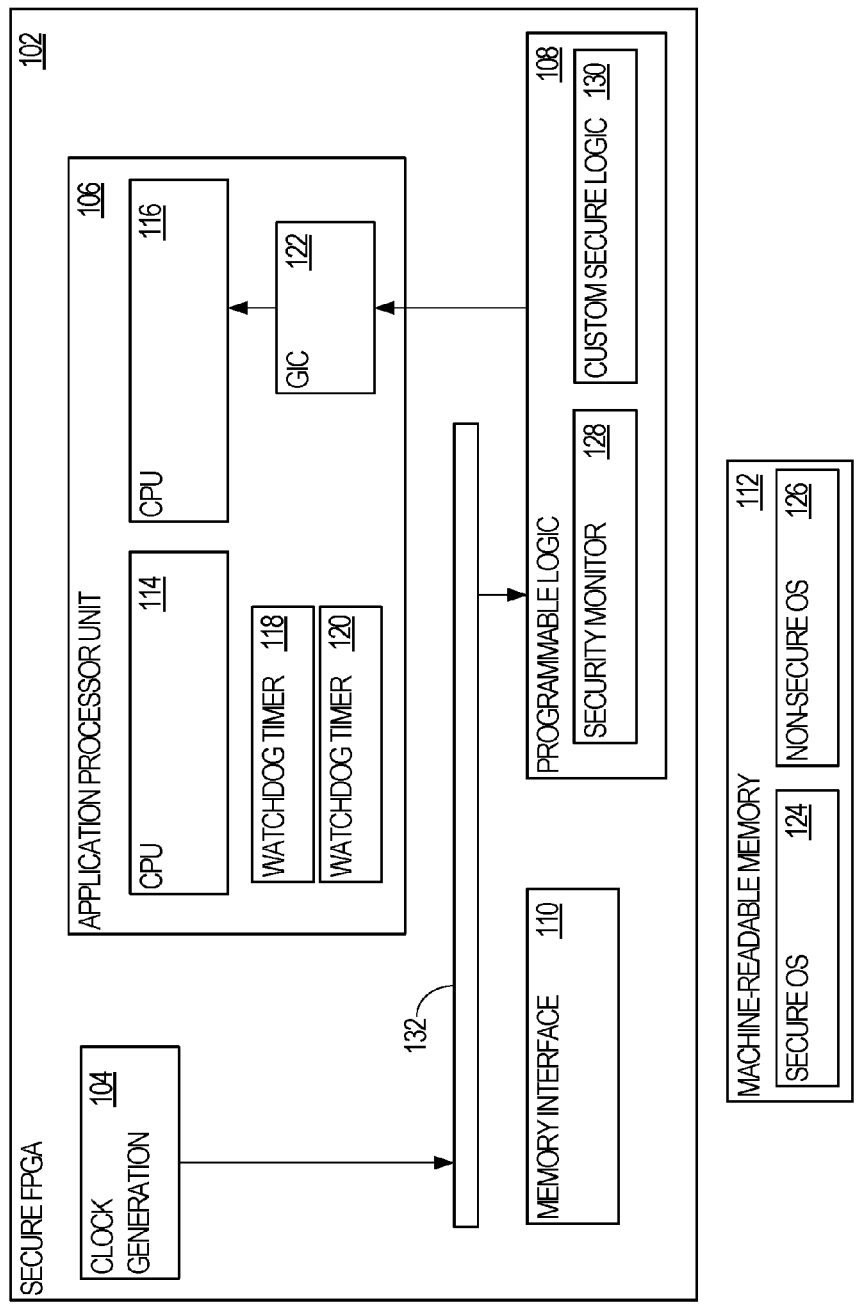
FIG. 2 is a block diagram illustrating a communication pathway that places a CPU of the FPGA of FIG. 1 in a secured state, according to an example embodiment.

FIG. 2 is a block diagram illustrating a communication pathway that places the CPU 116 of the secure FPGA 102 in a secured state, according to an example embodiment. To transition the CPU 116 to the secure environment, the security monitor 128 executes a function call provided by the custom secure logic 130. In particular, the security monitor 128 sends an FIQ to the GIC 122 with an identifier in the targeted CPU parameter indicating that CPU 116 is the targeted CPU. Furthermore, an instruction accompanies the FIQ indicating that CPU 116 is to transition to the secure environment. In one embodiment, the security monitor 128 transmits this FIQ and executes this function call at a predetermined time interval. Examples of predetermined time intervals include millisecond time intervals, microsecond time intervals, second time intervals, and other such time intervals. To measure these time intervals, the security monitor 128 may implement its own timer, using the clock signal provided by the clock generation circuit 104. In one embodiment, the predetermined time interval is 100 ms. In this regard then, the security monitor 128 is configured to send the FIQ to the GIC 122 every 100 ms. In an alternative embodiment, the predetermined time interval is less than 100 ms to account for the possibility that the watchdog timer 120 may reach a zero value. Accordingly, in this alternative embodiment, the predetermined time interval may be 95 ms, 90 ms, or other such values less than 100 ms.

When the CPU 116 transitions to the secure environment, the CPU 116 interacts with its corresponding watchdog timer (e.g., watchdog timer 120). In one embodiment, the CPU 116 initially interacts with watchdog timer 120 after the initial boot sequence of the secure FPGA 102. As known to one of ordinary skill in the art, the secure FPGA 102 executes two different boot loaders: a first stage boot loader that loads a secure operating system (e.g., secure OS 124), and a second stage boot loader that loads a non-secure operating system (e.g., non-secure OS 126) after the secure OS 124 has been loaded. One example of the secure OS 124 is the Sierraware SierraTEE, which is available from Sierraware, located in Sunnyvale, Calif. One example of the non-secure OS 126 is the Linux OS.

During execution of the non-secure OS 126, the secure OS 124 executes as a background process. When secure resources are needed by the non-secure OS 126, a context switch is performed by one or more of the CPUs 114, 116 in which the secure OS 124 is loaded to the foreground. In this way, both operating systems can occupy and execute on the secure FPGA 102.

The machine-readable memory 112 is communicatively coupled to the secure FPGA 102 via a memory interface 110. The machine-readable memory 112 includes one or more devices configured to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable memory" should be taken to include a single memory or multiple media (e.g., a centralized or distributed database, or associated caches and servers) able to store the secure OS 124 and the non-secure OS 126. Accordingly, the machine-readable memory 112 may be implemented as a single storage apparatus or device, or, alternatively and/or additionally, as a "cloud-based" storage systems or storage networks that include multiple storage apparatus or devices. As shown in FIG. 1, the machine-readable memory 112 excludes signals per se.

The memory interface 110 includes one or more interfaces configured to communicate with the machine-readable memory 112. The memory interface 110 may include such wired interfaces as a Universal Serial Bus (USB) interface, a microSD interface, an IEEE 1394 interface, or other such wired interfaces or combination of wired interfaces. In this manner, the secure OS 124 and the non-secure OS 126 are transferable from the machine readable memory 112 to the secure FPGA 102.

With the addition of the security monitor 128, the boot sequence of the secure FPGA 102 includes instantiating a BootROM, which, in turn, loads and executes a first stage boot loader. The first stage boot loader then loads and instantiates the security monitor 128, which is followed by loading and executing the secure OS 124, loading and executing a second stage boot loader, and then finally loading and executing the non-secure OS 126. While not shown, the secure OS 124 and the non-secure OS 126 are transferred to an internal memory of the secure FPGA 102, which can be partitioned into secure segments and non-secure segments.

As known to one of ordinary skill in the art, the first stage boot loader is primarily responsible for loading and executing the secure OS 124. However, with the addition of the security monitor 128, the first stage boot loader loads the security monitor 128 and the custom secure logic 130 into the programmable logic 108 prior to the instantiation of the secure OS 124. In this manner, the security monitor 128 then executes to initially secure various resources and peripherals of the secure FPGA 102, such as registers, memory addresses, communication lines (e.g., determining whether one or more communication interfaces are being utilized), and other such resources and peripherals. Furthermore, the security monitor 128 executes one or more of the modifications provided by the custom secure logic 130, such as by assigning the watchdog timer 120 as a secure resource (e.g., to be accessed via the secure environment) and by establishing one or more local timers (e.g., a first timer that indicates when the security monitor 128 should instruct the CPU 116 to transition to the secure environment and a timer that indicates when the security monitor 128 should check the status register of the watchdog timer 120).

The security monitor 128 continuously monitors the resources of the secure FPGA 102. After the security monitor 128 and switch is provided a signal indicating that the secure FPGA 12 secure, the first stage boot loader then loads the secure OS 124. Thereafter, the secure OS 124 instantiates a second stage boot loader (not shown), which then loads the non-secure OS 126.

When the security monitor 128 detects the loading of the non-secure OS 126, the security monitor 128, via the custom secure logic 130, then begins the monitoring of the execution of the secure environment as previously discussed above. In one embodiment, such monitoring includes loading an initial value into the watchdog timer 120 via the watchdog interface provided by the custom secure logic 130. As discussed above, this initial value may be 100 ms. The security monitor 128 then instructs the CPU 116 to initialize the countdown operation of the watchdog timer 120 via the CPU interface of the custom secure logic 130. Thereafter, or in parallel, the security monitor 128 implements its own timer to ensure that it sends the FIQ to CPU 116 as discussed above in reference to FIG. 2.

Figure 3:
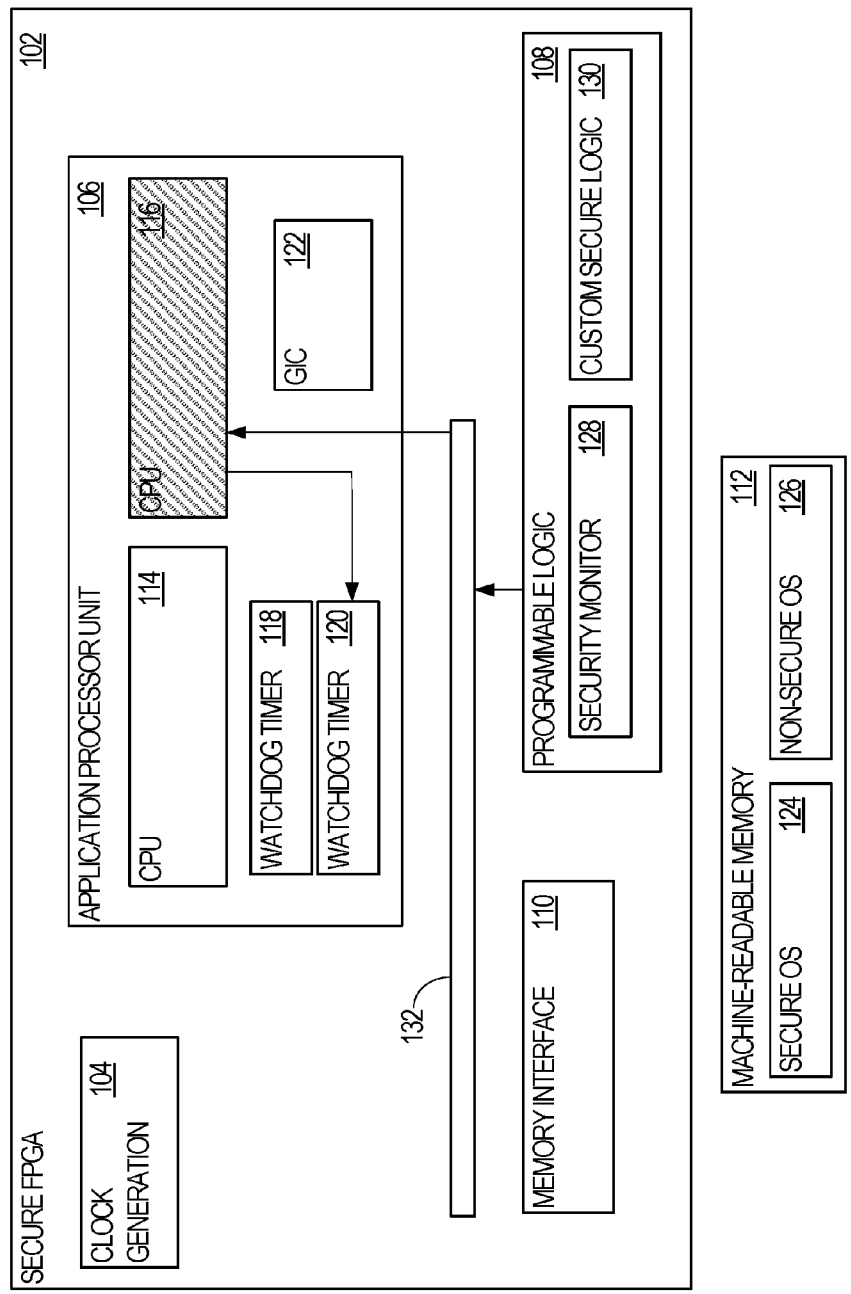
FIG. 3 is a block diagram illustrating a communication pathway that resets a watchdog timer of the FPGA of FIG. 1, according to an example embodiment.

Once the CPU 116 has transitioned to the secure environment, the CPU 116 is then instructed, via the security monitor 128, to reload the watchdog timer 120. FIG. 3 is a block diagram illustrating a communication pathway that resets the watchdog timer 120, according to an example embodiment. As shown in FIG. 3, the CPU 116 is executing in the secure environment as indicated by the shading of the block representing CPU 116. Accordingly, the CPU 114 is executing in the non-secure environment. In one embodiment, the security monitor 128 instructs the CPU 116 to reload the value of 100 ms in the load value register of the watchdog timer 120 while the CPU 116 is executing in the secure environment. Such instruction may be communicated via one or more bus lines of the system bus 132.

As the CPU 116 is reloading the watchdog timer 120, the security monitor 128 is also monitoring the watchdog timer 120 to confirm that the watchdog timer 120 was, in fact, reset. Accordingly, the custom secure logic 130 includes a function call that the security monitor 128 executes at approximately the same time, or shortly after, the CPU 116 reloads the load value register of the watchdog timer 120. For example, the security monitor 128 may execute the function call at approximately 105 ms after the CPU 116 has reloaded the load value register of the watchdog timer 120. In one embodiment, the function call instructs the security monitor 128 to retrieve a value stored in the status register associated with the watchdog timer 120. As discussed with regard to FIG. 1, the status register stores a value indicating whether the watchdog timer 120 reached a zero value.

Should the watchdog timer 120 reach a zero value and set an event flag in the status register indicating that the zero value was reached, this value would signify to the security monitor 128 that the CPU 116 did not, in fact, reset the watchdog timer 120. In one embodiment, where the CPU 116 resets the watchdog timer 120, the reset may also clear the status register so that the status register does not indicate that the zero value was reached.

Where the security monitor 128 determines that the CPU 116 did not execute in the secure environment, the security monitor 128 may generate an FIQ for the GIC 122. With reference to FIG. 1, this FIQ is communicated via the dedicated communication line 134.

Figure 4:
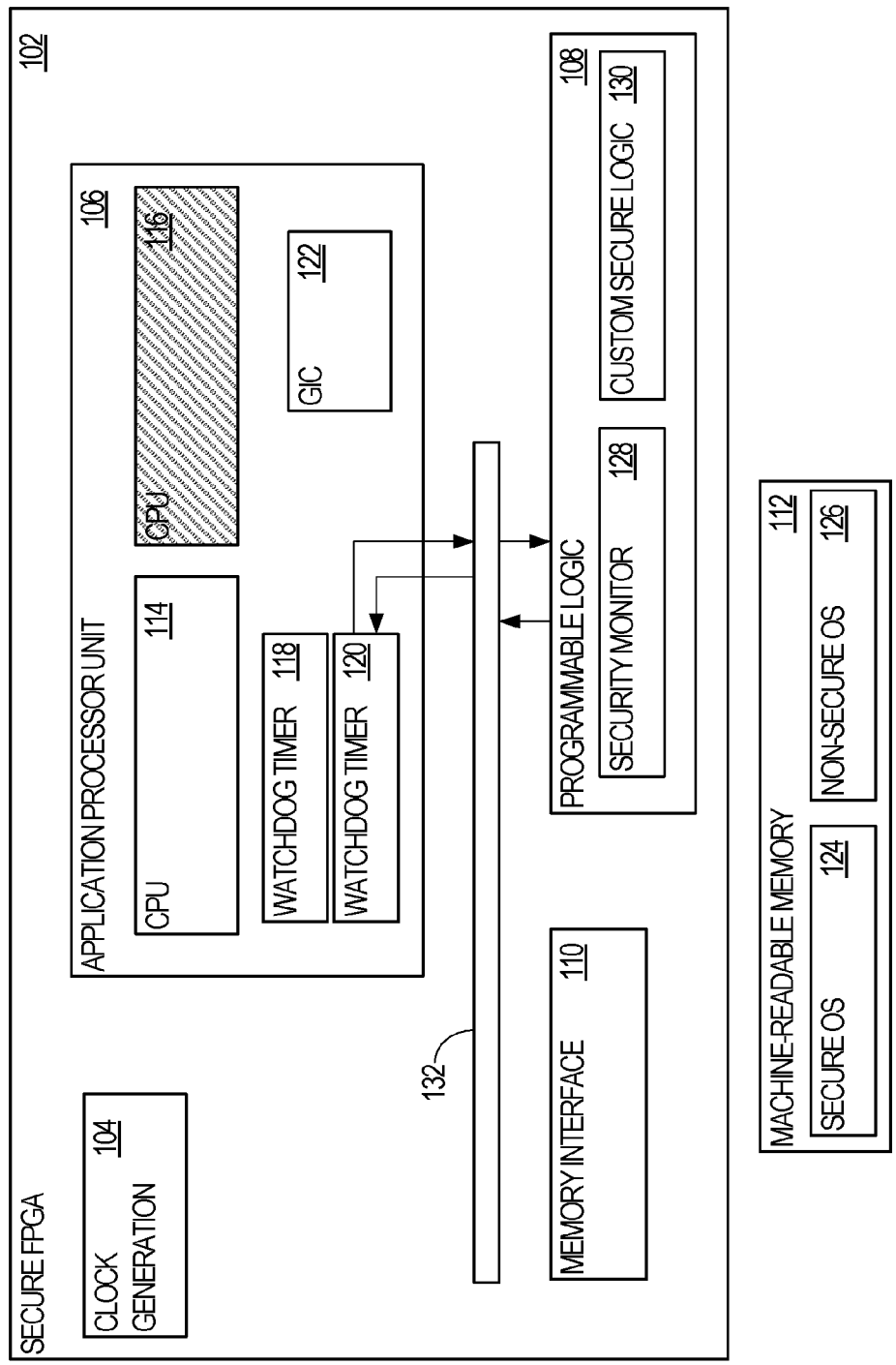
FIG. 4 is a block diagram illustrating a communication pathway for confirming that the watchdog timer of FIG. 3 was reset, according to an example embodiment.

FIG. 4 is a block diagram illustrating a communication pathway for confirming that the watchdog timer of FIG. 3 was reset, according to an example embodiment. As shown in FIG. 4, the security monitor 128 communicates with the watchdog timer 120 via one or more bus lines of the system bus 132. In one embodiment, a security monitor 128 executes a function call defined by the custom secure logic 130 that causes the security monitor 128 to read from the status register associated with the watchdog timer 120. The status register may store a value selected from one or more predetermined values, such as a first value corresponding to the watchdog timer 120 having reached zero and a second value corresponding to the watchdog timer 120 not having reached zero or corresponding to a default value (e.g. a value indicating that no event has occurred). In this regard, when the security monitor 128 retrieves the value stored in the status register, the security monitor 128 compares the retrieved value with the predetermined value indicating that the watchdog timer 120 has reached zero. Where these values are not equal, the security monitor 128 then determines that the watchdog timer 120 was reset by the CPU 116 executing in the secured environment. Where these values are equal, the security monitor 128 then determines that the watchdog timer 120 was not reset by the CPU 116.

While not shown in FIGS. 2-4, the CPU 116 returns to the non-secure environment after having reset the watchdog timer 120 (provided that the secure environment is still functioning properly). In one embodiment, the security monitor 128 provides the instruction for the CPU 116 to return to the non-secure environment when it initially instructs the CPU 116 to enter the secure environment. In an alternative embodiment, the security monitor 128 provides instruction for the CPU 116 to return to the non-secure environment after the security monitor 128 determines the status of the watchdog timer 120. In this manner, and provided that the secure environment is functioning properly, the CPU 116 alternates between the secure environment and non-secure environment according to the predetermined time interval established by the security monitor 128 (e.g., approximately every 100 ms).

In some instances, the secure environment may not function properly (e.g., the CPU 116 does not transition to the secure environment). For example, malicious code or hardware tampering may cause the GIC 122 to fail, in which case the GIC 122 fails to notify the CPU 116 that it should transition to the secure environment. As another example, this malicious code or hardware tampering may cause interruptions in the system bus 132 or may hijack the secure OS 124, in which case the CPU 116 may fail to reset the watchdog timer 120. As the security monitor 128 operates independently of the secure OS 124 and the non-secure OS 126, it can still check the status register of the watchdog timer 120 even in the event of such disruptions.

Accordingly, and referring back to FIG. 1, the security monitor 128 is configured, via the custom secure logic 130, to take one or more actions depending on the value stored in the status register of the watchdog timer 120. In one embodiment, where the value stored in the status register of the watchdog timer 120 indicates that the watchdog timer 120 has reached zero, the security monitor 128 sends an FIQ to the GIC 122 to cause one or more of the CPUs 114, 116 to execute one or more instructions provided by the security monitor 128 to secure the secure FPGA 102. Securing the secure FPGA 102 may include, but is not limited to, erasing one or more memories communicatively coupled to the secure FPGA 102, unloading or erasing one or more registers associated with the various components of the secure FPGA 102, disabling access to one or more peripherals or components of the secure FPGA 102, and powering down the secure FPGA 102 to prevent further operations. In addition, the secure FPGA 102 may be placed in a secure state that requires user input or the execution of the secure OS 124 to unlock it or take it out of the secure state.

The security monitor 128 is also configured, via the custom secure logic 130, to take action based upon one or more conditions having been designated as security failures. These conditions include, but are not limited to, the clock signal being generated by the clock generation circuit 104 exceeding a preset limit, an uncorrectable error in one or more configuration registers (e.g., one or more registers that configure corresponding components of the secure FPGA 102), tampering of the bitstream being sent to the secure FPGA 102, operational temperatures of the secure FPGA 102 exceeding presets limits, and other such conditions or combinations of conditions. In some instances, where one or more CPUs 114, 116 fail to initiate the security lockdown procedures defined by the custom secure logic 130, the security monitor 128 sends a reset signal to a reset register of the secure FPGA 102, which causes the entire system, including the APU 106, to enter a reset state.

Figure 5A:
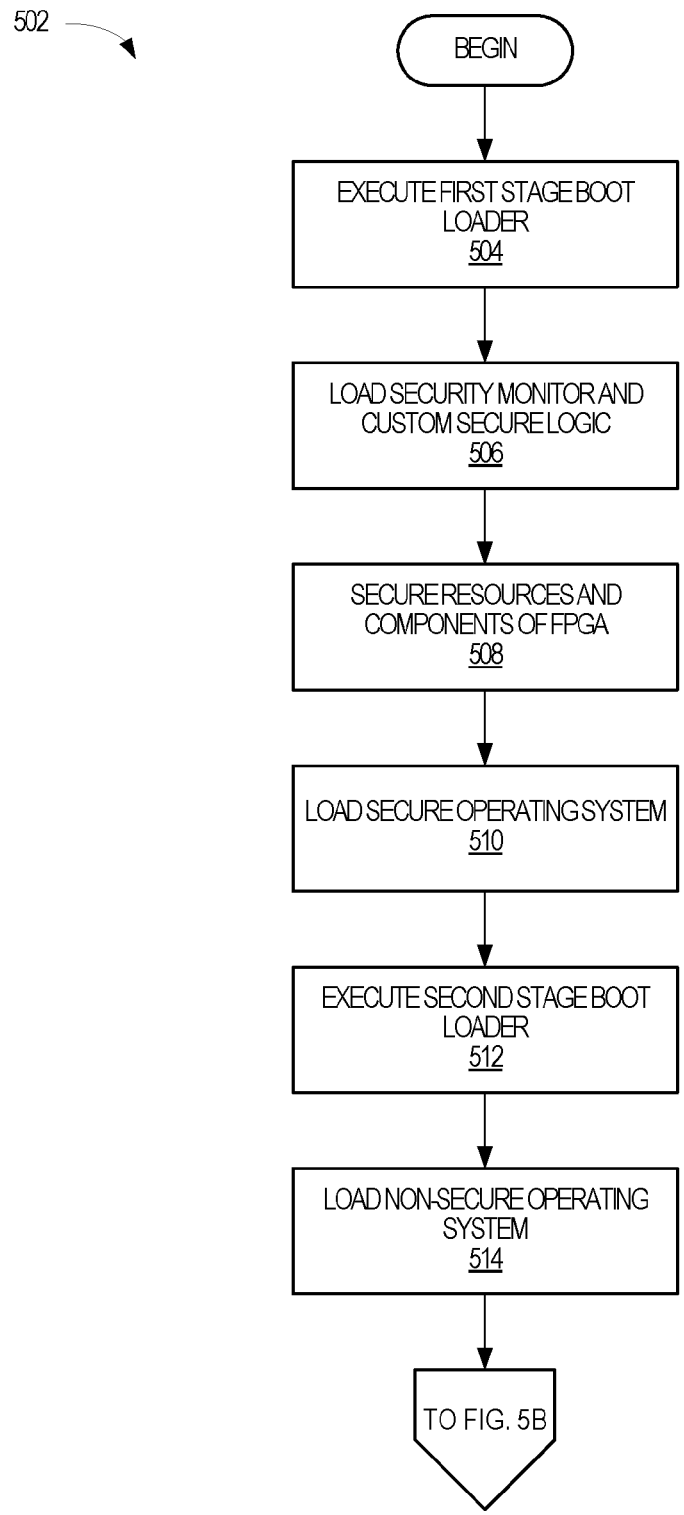
FIGS. 5A-5C illustrate a method, according to an example embodiment, that implements the disclosed modified security monitor.

FIG. 5 illustrates a method 502, according to an example embodiment, that implements the disclosed modified security monitor. With reference to FIG. 1, the method 502 is implemented by one or more of the components of the secure FPGA 102 and is described by way of reference thereto.

Initially, the secure FPGA 102 executes a BootROM stored in a machine-readable memory local to the secure FPGA 102, which then loads and executes a first stage boot loader (Operation 504). Thereafter, the first stage boot loader then loads the security monitor 128 modified by the custom secure logic 130 into the programmable logic 108 (Operation 506). As explained above, the security monitor 128 performs an initial security check of the secure FPGA 102, such as by clearing registers, clearing memory addresses, determining whether one or more bus lines or communication lines are in use, and other such operations (Operation 508).

Once this initial security check is completed, the security monitor 128 informs the first stage boot loader, which then loads and executes the secure OS 124 from the machine-readable memory 112 (Operation 510). After the secure OS 124 has initialized, it then executes a second stage boot loader (not shown) (Operation 512). In turn, the second stage boot loader loads and executes the non-secure OS 126 from the machine readable memory 112 (Operation 514). With the loading and executing of the non-secure OS 126, the secure FPGA 102 is placed into an operational status.

Figure 5B:
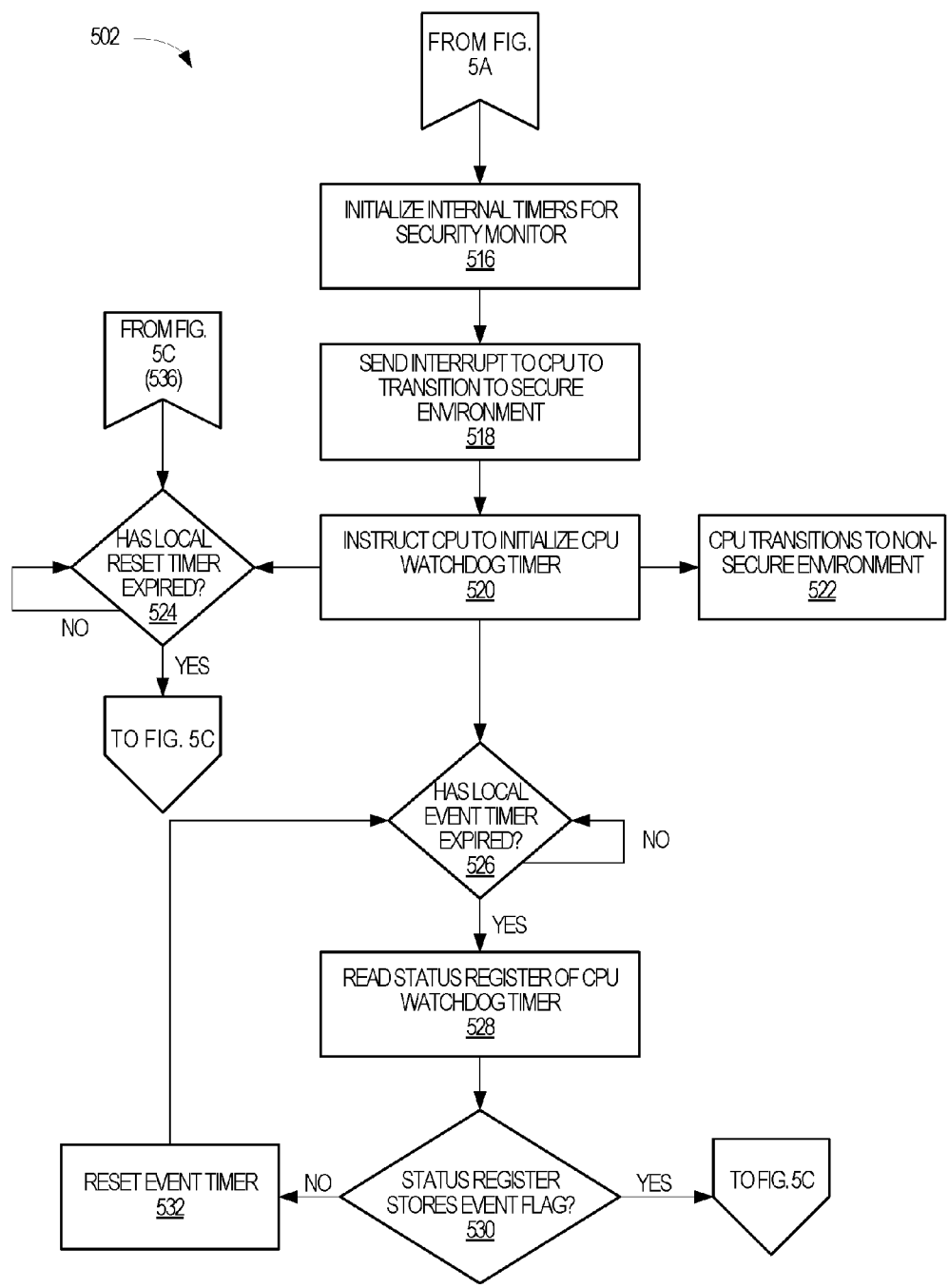

Referring to FIG. 5B, the security monitor 128 initializes one or more internal (e.g., local) timers for monitoring the execution of the secure environment (Operation 516). As discussed above, a first timer may be an event timer that signals when the security monitor 128 should check the status register of the watchdog timer 120 and a timer may be a reset timer that signals when the security monitor 128 should send a reset signal (e.g., an FIQ) to the CPU 116.

After initializing the local timers, the security monitor 128 then sends the FIQ to the CPU 116 via the GIC 122 (Operation 518). This FIQ includes, or is followed by, an instruction to initialize the CPU watchdog timer 120 with an initial value (e.g., 100 ms) (Operation 520). At Operation 520, the method 502 branches into checking the local timers of the security monitor 128 and transitioning the CPU 116 back to the non-secure environment (Operation 522).

In one embodiment, the security monitor 128 determines whether the local reset timer has expired (Operation 524). In this embodiment, this includes determining whether the local reset timer has met or exceeded 100 ms. Where the local reset timer has not expired (e.g., the "NO" branch of Operation 524), the security monitor 128 continues the decrementing (or incrementing) of the local reset timer. Where the local reset timer has expired (e.g., the "YES" branch of Operation 524), the method flow proceeds to Operation 534 of FIG. 5C (discussed further below).

In serial or in parallel, the security monitor 128 also determines whether the local event timer has expired (Operation 526). Where the local event timer has not expired (e.g., the "NO" branch of Operation 526), the security monitor 128 continues the decrementing (or incrementing) of the local event timer. Where the local event timer has expired (e.g., the "YES" branch of Operation 526), the method flow proceeds to Operation 528. At Operation 528, the security monitor 128 reads the status register of the watchdog timer 120 to determine whether the watchdog timer 120 has reached a zero value. As discussed above, should the watchdog timer 120 reach a zero value, this would indicate that the CPU 116 failed to enter the secure environment and reset the watchdog timer 120.

The security monitor 128 then determines whether the status register of the watchdog timer 120 stores an event flag corresponding to the watchdog timer 120 having reached a zero value (Operation 530). In one embodiment, the status register may store a default or NULL value indicating that it has not yet reached a zero value or may store a value indicating that it has reached zero. Accordingly, the security monitor 128 compares the value of the status register with one or more predetermined or preprogrammed values to determine whether or not the watchdog timer 120 was reset. Where the watchdog timer 120 does not store the event flag corresponding to the watchdog timer 120 having reached a zero value (e.g., the "NO" branch of Operation 530), the security monitor 128 resets its local events timer (Operation 532). The method flow then proceeds back to Operation 526. However, where the watchdog timer does store the event flag corresponding to the watchdog timer 120 having reached the zero value (e.g., the "YES" branch of Operation 530), the method flow proceeds to Operation 542 of FIG. 5C.

Figure 5C:
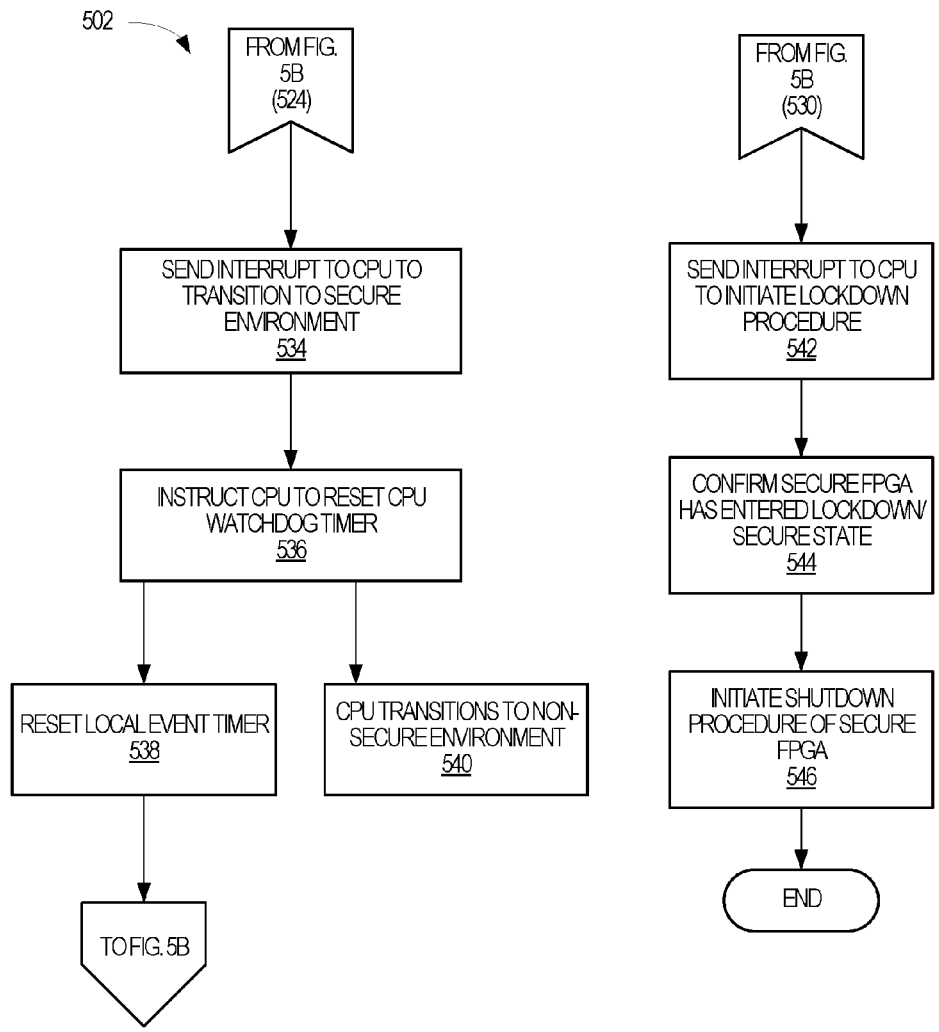

Referring to FIG. 5C, and starting with the method flow from Operation 534 (e.g., the local reset timer having expired), the security monitor 128 sends an interrupt to the CPU 116 to transition to the secure environment (Operation 534). Along with the interrupt to the CPU, or subsequent to the interrupt sent to the CPU 116, the security monitor 128 instructs the CPU 116 to reset the watchdog timer 120 (Operation 536). As discussed previously, this may include the CPU 116 storing a timer value (e.g., 100 ms) in a load value register associated with the watchdog timer 120. The CPU 116 may then instruct the watchdog timer 120 to resume its countdown procedure. In addition, the security monitor 128 then resets its local event timer in preparation for the next time the security monitor 128 is to send another interrupt to the CPU 116 (Operation 538). Subsequently or in parallel, the CPU 116 then transitions back to the non-secure environment (Operation 540). The method flow then returns to Operation 524 of FIG. 5B.

Referring now to Operation 530 of FIG. 5B, the method flow then proceeds to Operation 542 of FIG. 5C. The method flow reaches Operation 542 where the security monitor 128 determines that the CPU 116 has failed to reset the watchdog timer 120. This would signal that the CPU 116 failed to transition to the secure environment and that there is potentially a fatal or security flaw in the secure environment. Accordingly, the security monitor 128 may attempt to send an interrupt to one or more of the CPUs 114, 116 to initiate a lockdown procedure. As discussed above, this procedure may include clearing out (e.g., erasing) one or more memory addresses and/or registers, disabling or powering down one or more peripherals, preventing access or further access to components and resources of the secure FPGA 102, and other such actions. As the security monitor 128 may operate independently of the CPUs 114, 116, the security monitor 128 may then confirm that the secure FPGA 102 has entered the lockdown or secure state (Operation 544).

Should the security monitor 128 failed to confirm that the secure FPGA 102 has entered the secure state, the security monitor 128 may implement its own measures to secure the secure FPGA 102. For example, the security monitor 128 may store a value in a reset register of the secure FPGA 102, which causes a reset in one or more components of the secure FPGA 102. The security monitor 128 then initiates a shutdown procedure of the secure FPGA 102, which may include powering down one or more peripherals or components of the secure FPGA 102 (Operation 546).

In this way, this disclosure provides a modified security monitor for an FPGA that confirms whether a secure environment has properly executed. This feature has ramifications in the security world because a conventional security monitor typically monitors whether components of the FPGA have been tampered with and not whether an entire environment is functioning properly. In addition, this disclosure provides additional interfaces and function calls that hook into an existing security monitor, which effectively extends the feature set and technical capabilities of the security monitor. Thus, the technical benefit of the disclosed modified security monitor is that it provides a more robust security solution than has previously existed.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-5C are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Example Machine Architecture and Machine-Readable Medium

Figure 6:
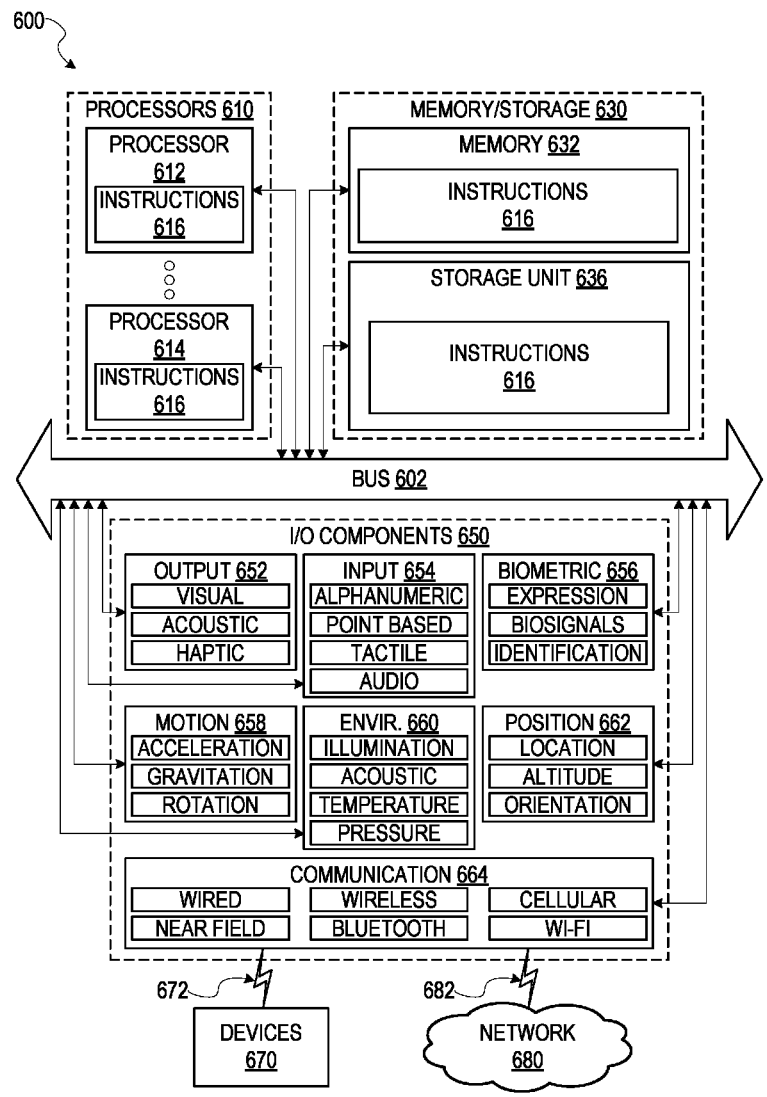
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example the instructions may cause the machine to execute the flow diagrams of FIGS. 5A-5C. Additionally, or alternatively, the instructions may implement one or more of the components of FIG. 1. The instructions transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a personal digital assistant (PDA), or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory/storage 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 612 and processor 614 that may execute instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software. Language Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system for securing a field-programmable gate array, the system comprising:
    a first machine-readable memory storing a first operating system that implements a secure environment for a field-programmable gate array (FPGA);
    a second machine-readable memory storing a second operating system that implements a non-secure environment for the FPGA;
    at least one hardware processor of the FPGA communicatively coupled to the first machine-readable memory and the second machine-readable memory, the at least one hardware processor configurable to:
        transition to the secure environment by executing the first operating system;
        reset a watchdog timer communicatively coupled to the at least one hardware processor by loading a register associated with the watchdog timer with a predetermined value; and
        transition to the non-secure environment by executing the second operating system; and
    programmable logic of the FPGA communicatively coupled to the at least one hardware processor, the programmable logic configurable to:
        implement a reset timer, the reset timer signaling when the programmable logic is to instruct the at least one hardware processor to transition to the secure environment;
        retrieve an event value from a status register associated with the watchdog timer; and
        determine whether the first operating system was executed by the at least one hardware processor by comparing the retrieved event value with a second predetermined value.

2. The system of claim 1, wherein the watchdog timer comprises a private watchdog timer assigned to the at least one hardware processor.

3. The system of claim 1, wherein the predetermined value comprises a time interval measured in milliseconds.

4. The system of claim 1, wherein the programmable logic is further configurable to implement the reset timer by using the predetermined value loaded into the register associated with the watchdog timer.

5. The system of claim 1, wherein the programmable logic is further configurable to implement an event timer, the event timer signaling when the programmable logic is to retrieve the event value from the status register associated with the watchdog timer.

6. The system of claim 5, wherein the programmable logic is further configurable to implement the event timer using a time interval greater than the predetermined value loaded into the register associated with the watchdog timer.

7. The system of claim 1, wherein the programmable logic is further configurable to repetitively instruct the at least one hardware processor to transition to the secure environment and retrieve the event value from the status register so long as the programmable logic determines that the watchdog timer did not reach a zero value.

8. The system of claim 7, wherein the retrieved event value comprises a first value indicating that the watchdog timer did not reach a zero value or a second value indicating that the watchdog timer reached a zero value.

9. The system of claim 1, wherein the programmable logic is further configurable to initiate a lockdown procedure for the FPGA where the comparison of the retrieved event value with the second predetermined value indicates that the watchdog timer was not reset by the at least one hardware processor.

10. A method for securing a field-programmable gate array, the method comprising:
  instructing, by a programmable logic of a field-programmable gate array (FPGA), at least one hardware processor of the FPGA to transition to a secure environment, the secure environment implemented by a first operating system executable by the at least one hardware processor;
  instructing, by the programmable logic, the at least one hardware processor to reset a watchdog timer communicatively coupled to the at least one hardware processor with a predetermined value;
  instructing, by the programmable logic, the at least one hardware processor to transition to a non-secure environment, the non-secure environment implemented by a second operating system executable by the at least one hardware processor;
  implementing, by the programmable logic, an event timer signaling when the programmable logic is to retrieve an event value from a status register associated with the watchdog timer;
  retrieving, by the programmable logic, the event value from the status register associated with the watchdog timer; and
  determining, by the programmable logic, whether the first operating system was executed by comparing the retrieved event value with a second predetermined value.

11. The method of claim 10, wherein the watchdog timer comprises a private watchdog timer assigned to the at least one hardware processor.

12. The method of claim 10, wherein the predetermined value comprises a time interval measured in milliseconds.

13. The method of claim 10, further comprising:
  implementing, by the programmable logic, a reset timer signaling when the programmable logic is to instruct the at least one hardware processor to transition to the secure environment.

14. The method of claim 13, wherein the reset timer is implemented using the predetermined value used to reset the watchdog timer.

15. The method of claim 10, wherein the event timer is implemented using a time interval greater than the predetermined value loaded into the register associated with the watchdog timer.

16. The method of claim 10, further comprising:
  repetitively instructing the at least one hardware processor to transition to the secure environment and repetitively retrieving the event value from the status register so long as the programmable logic determines that the watchdog timer did not reach a zero value.

17. The method of claim 16, wherein the retrieved event value comprises a first value indicating that the watchdog timer did not reach a zero value or a second value indicating that the watchdog timer reached a zero value.

18. The method of claim 10, further comprising:
  initiating a lockdown procedure for the FPGA where the comparison of the retrieved event value with the second predetermined value indicates that the watchdog timer was not reset by the at least one hardware processor.

* * * * *

UNITED STATES PATENT AND TRADEMARK OFFICE
CERTIFICATE OF CORRECTION

PATENT NO. : 9,940,483 B2
APPLICATION NO. : 15/005412
DATED : April 10, 2018
INVENTOR(S) : Areno et al.

Page 1 of 1

It is certified that error appears in the above-identified patent and that said Letters Patent is hereby corrected as shown below:

In the Specification

In Column 3, Line 26, delete "CPUS" and insert --CPUs-- therefor

In Column 3, Line 30, delete "CPUS" and insert --CPUs-- therefor

In Column 7, Line 21, delete "12" and insert --102-- therefor

Signed and Sealed this
Tenth Day of September, 2019

Andrei Iancu
*Director of the United States Patent and Trademark Office*